United States Patent [19]

Inoue et al.

[11] Patent Number: 6,070,650

[45] Date of Patent: Jun. 6, 2000

[54] VEHICULAR AIR CONDITIONING SYSTEM

[75] Inventors: Yoshimitsu Inoue, Chiryu; Yasukazu Kitamine, Kariya; Masashi Iwai, Chiryu; Hiroshi Kishita, Anjo; Hiroshi Nonoyama, Toyota; Toshihiko Muraki, Kariya; Takayoshi Matsuno, Okazaki; Hirofumi Mokuya, Kariya, all of Japan

[73] Assignee: Denso Corporation, Kariya, Japan

[21] Appl. No.: 08/978,748

[22] Filed: Nov. 26, 1997

[30] Foreign Application Priority Data

Nov. 29, 1996 [JP] Japan ................................. 8-319938

[51] Int. Cl.⁷ ...................................................... B60H 3/00
[52] U.S. Cl. ............................ 165/42; 165/43; 165/202; 454/121; 454/156; 62/244
[58] Field of Search ................... 165/42, 43, 202; 62/244, 324.1, 324.6; 454/156, 121

[56] References Cited

U.S. PATENT DOCUMENTS

| | | | |
|---|---|---|---|
| 4,165,782 | 8/1979 | Kumagai | 165/43 |
| 4,167,967 | 9/1979 | Kumagai | 165/43 |
| 4,183,397 | 1/1980 | Poirier D'Ange D'Orsay et al. | 165/43 |
| 4,311,188 | 1/1982 | Kojima et al. | 165/43 |
| 4,339,076 | 7/1982 | Sakakibara | 165/43 |
| 4,385,503 | 5/1983 | Okura | 165/43 |
| 5,273,105 | 12/1993 | Higashihara et al. | 165/43 |
| 5,316,074 | 5/1994 | Isaji et al. | 165/43 |
| 5,325,912 | 7/1994 | Hotta et al. | 165/43 |
| 5,390,728 | 2/1995 | Ban | 165/43 |
| 5,497,941 | 3/1996 | Numazawa | 165/43 |
| 5,501,267 | 3/1996 | Iritani et al. | 165/43 |
| 5,524,446 | 6/1996 | Hotta et al. | 165/43 |
| 5,562,538 | 10/1996 | Suyama | 165/43 |
| 5,641,016 | 6/1997 | Isaji et al. | 165/43 |
| 5,775,415 | 7/1998 | Yoshimi et al. | 165/43 |

*Primary Examiner*—Ira S. Lazarus
*Assistant Examiner*—Terrell McKinnon
*Attorney, Agent, or Firm*—Harness, Dickey & Pierce, PLC

[57] ABSTRACT

To provide a vehicular air conditioning system for activating an electric heater with the output coming from an inverter by actuating a relay at a reasonable cost, a relay and an electric heater acting as electric heat source are connected in series between an output line of three output lines of an inverter and the negative side of a vehicular power supply. The electric heater employs a nichrome wire as its heating element and is used for warming the inside of a vehicle compartment. Moreover, the relay is turned ON/OFF after the output voltage of the inverter is set to zero. As a result, the durability of the relay can be improved, and this relay can be implemented by an existing one without newly manufacturing any dedicated relay so that the cost can be lowered.

20 Claims, 4 Drawing Sheets

VEHICULAR AIR CONDITIONING SYSTEM

CROSS-REFERENCE TO RELATED APPLICATION

This application is related to Japanese Patent Application No. Hei 8-319938, incorporated herein by reference.

BACKGROUND OF THE INVENTION

1. Field of the Invention

The present invention relates to a vehicular air conditioning system for controlling the number of revolutions per unit time of a compressor to make the air conditioning capacity variable by controlling an AC motor using an inverter and, more particularly, to a vehicular air conditioning system including an electric heater as a warming heat source for activating the AC motor and the electric heater with the output coming from the inverter by switching an electromagnetic relay.

2. Description of Related Art

Unexamined Published Japanese Patent Application Laid-Open No. 7-304325 (the "published system") discloses a system employing a three-phase AC motor as a motor for driving the compressor which controls the number of revolutions per unit time variably with the inverter.

In the published system, the power to the electric heater is intercepted by means of an inexpensive electromagnetic relay. Here, the electric contacts of the relay are provided at the individual three output lines between the inverter and the three-phase AC motor, either of which is selectively activated by the output coming from the inverter.

In other words, the three-phase AC motor is controlled at a cooling time with the output coming from the inverter, and the electric heater is energized at a warming time by the inverter.

Here, the electric heater can be made small by raising the voltage to a high level (e.g., 300 VDC, for example), and is highly advantageous for a vehicular air conditioning system which is restricted in its mounting space.

Therefore, the inventors of the present invention have examined the actions of the relay for the output voltage of the inverter in the published system. It has been revealed by the examinations that when the relay is activated for a high output voltage coming from the inverter, there arises a problem that the contacts are damaged, thereby deteriorating the durability of the arm with the contacts of the relay being opened.

In order to solve this problem, moreover, it is sufficient to raise the breakdown voltage (or capacity) of the relay. No appropriate relay capable of raising the breakdown capacity sufficiently is commercially available at present. When such an improved relay is to be newly manufactured, there arises another problem that the manufacturing facilities raise the cost.

SUMMARY OF THE INVENTION

It is therefore an object of the present invention to provide a vehicular air conditioning system, which can activate the electric heater with the output of the inverter by actuating the relay, at a low cost.

The above objects are achieved according to an aspect of the present invention by providing a vehicular air conditioning system which includes an air conditioning compressor driven by an AC motor, an inverter for converting the output of a vehicular power supply into AC power to control the AC motor, a relay for interrupting the feed of the inverter to an electrical heating element, a signal generator for generating an instruction signal to actuate the relay, and a controller for lowering the output voltage of the inverter, when the instruction signal is generated by the signal generator, to actuate the relay.

As a result, the durability of the relay can be improved, and the relay can be implemented by an existing relay without newly manufacturing any dedicated relay so that the cost can be lowered.

Preferably, the AC motor is a three or more phase motor, the relay has electrical contacts provided at one of a plurality of output lines from the inverter to the AC motor, and the controller is for bringing the AC motor to a stop state by the inverter when it actuates the relay to energize the electrical heating element. The controller may stop the AC motor by intercepting the power supply to the remaining output lines.

Rather than lowering the output voltage of the inverter when the instruction signal is generated by the signal generator to actuate the relay, the controller may bring the AC motor to a stop by the inverter when the instruction signal is generated by the signal generating unit and when the controller actuates the relay to energize the electrical heating element.

It is further possible that the system includes an air conditioning case forming an air passage into the inside of a vehicle compartment, a heat exchanger for heating the air in the air conditioning case with a heat source fluid, and a heat source fluid passage for circulating the heat source fluid to the heat exchanger, where the electrical heating element is in the heat source fluid passage.

The system may further include an internal air temperature detecting unit for detecting the internal air temperature in the vehicle compartment, a temperature setting unit for determining a set temperature in the vehicle compartment, a heat source fluid temperature detecting unit for detecting the temperature of the heat source fluid circulating to the heat exchanger, and a calculation unit for calculating the necessary temperature of the heat source fluid based on at least the internal air temperature detected by the internal air temperature detecting unit and the set temperature determined by the temperature setting unit, where the controller is for actuating the relay to energize the electrical heating element when the fluid temperature detected by the heat source fluid temperature detecting unit is lower than the necessary temperature calculated by the calculation unit.

Alternatively, the system may include an internal air temperature detecting unit for detecting the internal air temperature in the vehicle compartment, a temperature setting unit for determining a set temperature in the vehicle compartment, a heat source fluid temperature detecting unit for detecting the temperature of the heat source fluid circulating to the heat exchanger; and a calculation unit for calculating the necessary temperature of the heat source fluid based on at least the internal air temperature detected by the internal air temperature detecting unit and the set temperature determined by the temperature setting unit, wherein the controller is for controlling the electrical heating element so that the temperature detected by the heat source fluid temperature detecting unit becomes the necessary temperature calculated by the calculation unit.

Finally, the system may additionally include an energization control unit for linearly controlling the power fed to the electrical heating element by the inverter and a chopping control unit in the energization control unit for controlling chopping of the output of the inverter to the electrical heating element.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A preferred embodiment of the present invention will be described with reference to the accompanying drawings. In this embodiment, the invention is applied to a hybrid vehicle which employs an internal combustion engine 23 (the "engine 23") and/or a not-shown driving electric motor as a prime mover for the vehicle.

Figure 1:
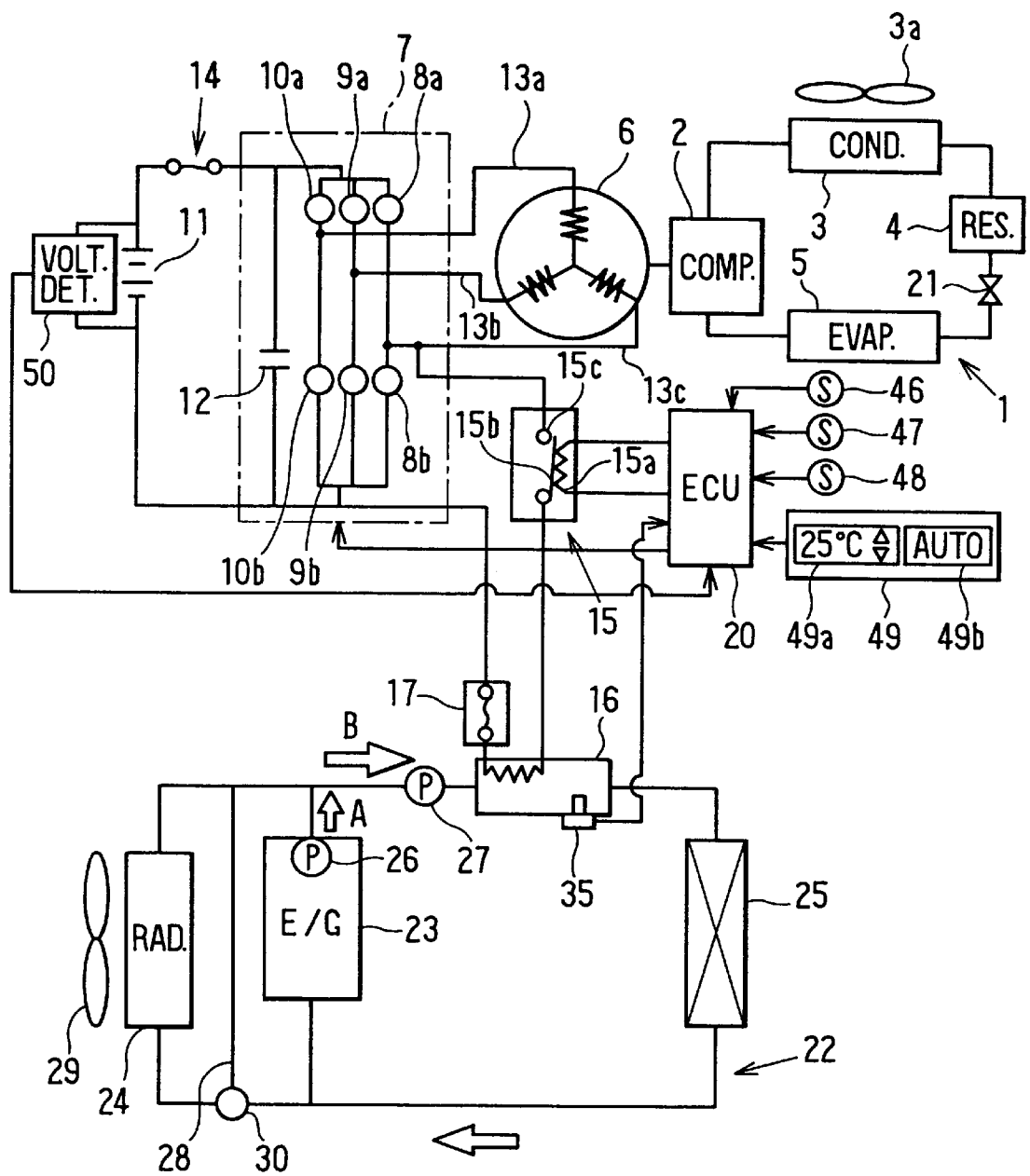
FIG. 1 is a diagram showing the entire construction of a preferred embodiment of the invention.

First of all, a refrigerating cycle 1 of the vehicular air conditioning system shown in FIG. 1 is known in the art and includes a compressor 2 for compressing a coolant to a high temperature and a high pressure and discharging it; a condenser 3 for condensing the coolant discharged from the compressor 2; a receiver 4 for separating the coolant, as condensed by the condenser 3, into gas-phase and liquid-phase coolants and reserving the liquid-phase coolant; a decompressor 21 for decompressing the liquid-phase coolant coming from the receiver 4; and an evaporator 5 for evaporating the coolant coming from the decompressor 21.

In the embodiment, the compressor 2 is driven by a three-phase AC motor 6. This three-phase motor 6 is driven and controlled at a variable speed by an inverter 7. Specifically, the three-phase AC motor 6 is driven and controlled at a variable speed by a three-phase AC output (or AC power) at a variable voltage and at a variable frequency, as switched from a DC current which is obtained from a vehicular power supply 11 (e.g., a DC power supply at a rated voltage of 288 V in the embodiment) by switching elements in the inverter 7, i.e., pairs of transistors 8a and 8b to 10a and 10b (e.g., insulated gate bipolar transistors in the embodiment) corresponding to the individual phases of the three-phase AC motor 6.

The inverter 7 is controlled by a later-described control unit 20. Here, the vehicular power supply 11 is charged, when engine 23 is active, by a generator (or alternator) driven by the engine 23.

The three pairs of transistors, individually designated by reference numerals 8, 9 and 10, are arranged in parallel with the vehicular power supply 11. Moreover, the output lines (or output terminals) 13a to 13b of the three-phase AC motor 6 are individually connected between the paired transistors 8a and 8b (9a and 9b, and 10a and 10b).

Here, the inverter 7 may be of any type if it can drive the three-phase AC motor 6 at a variable speed, but is exemplified by a three-phase PWM inverter in the embodiment. Reference numeral 14 appearing in FIG. 1 designates a thermal fuse which will blow at a predetermined temperature.

The condenser 3 is placed in a position for receiving the oncoming wind which is established by the running of the vehicle. Reference numeral 3a appearing in FIG. 1 designates a blower fan for blowing a cooling wind to the condenser 3. On the other hand, the evaporator 5 is a cooling heat exchanger for cooling (or dehumidifying) the inside of the vehicular compartment.

In the embodiment, an electromagnetic relay 15, an electric heat source or an electric heater 16 and a thermal fuse 17 are connected in series between the output line 13c of the three output lines 13a to 13b from the inverter 7 and the negative terminal of the vehicular power supply 11.

The relay 15 is composed, as is known in the art, of a relay coil 15a, a moving contact (or electric contact) 15b and a stationary contact (or electric contact) 15c. The electric heater 16 employs a nichrome wire as a heating element in the embodiment and is used for warming the inside of the vehicular compartment.

When the relay coil 15a of the relay 15 is energized, the power from the inverter 7 is fed to the electric heater 16 so that the electric heater 16 generates heat. Here, the inverter 7 and the relay 15 are controlled by the later-described control unit 20. As a result, the air in the vehicular compartment is controlled, as will be described in detail.

Here, the electric heater 16 is placed in a cooling water circuit 22 which is mounted on the vehicle. This cooling water circuit 22 will be described below.

The cooling water circuit 22 is a circuit for cooling the engine 23. Further, as shown in FIG. 1, the cooling water circuit 22 is equipped with a radiator 24 for cooling the engine cooling water and a heater core 25 acting as a heating heat exchanger for heating the inside of the vehicular compartment. The heater core 25 is arranged in the cooling water circuit 22 so that it uses the engine cooling water as the heat exchanging fluid.

Reference numeral 26 designates a mechanical water pump which is built in the engine 23 for discharging the cooling water in the direction of arrow A as it is driven by the engine 23. Reference numeral 27 designates an electric water pump which is driven by the power fed from the vehicular power supply 11. This electric water pump 27 discharges, as it is driven, the cooling water in the direction of arrow B. On the other hand, the electric water pump 27 is driven by the later-described control unit 20 when the engine 23 is inactive but a later-described vehicular air conditioning system 100 is active.

Reference numeral 28 appearing in FIG. 1 designates a bypass circuit which is connected in parallel with the radiator 24 for bypassing the radiator 24. Whether the cooling water is fed to the bypass circuit 28 or the radiator 24 is switched by the well-known thermostat 30 acting as a temperature sensitive valve. Specifically, the cooling water is cooled by the radiator when its temperature exceeds 90° C., for example, and is otherwise fed to the bypass circuit 28.

Reference numeral 29 designates a cooling fan for blowing cooling air to the radiator 24. Here, this cooling fan 28 is driven when the temperature, as detected by the (not-shown) cooling water temperature sensor placed in the vicinity of the cooling water exit of the engine 23, reaches 100° C., for example.

Figure 2:
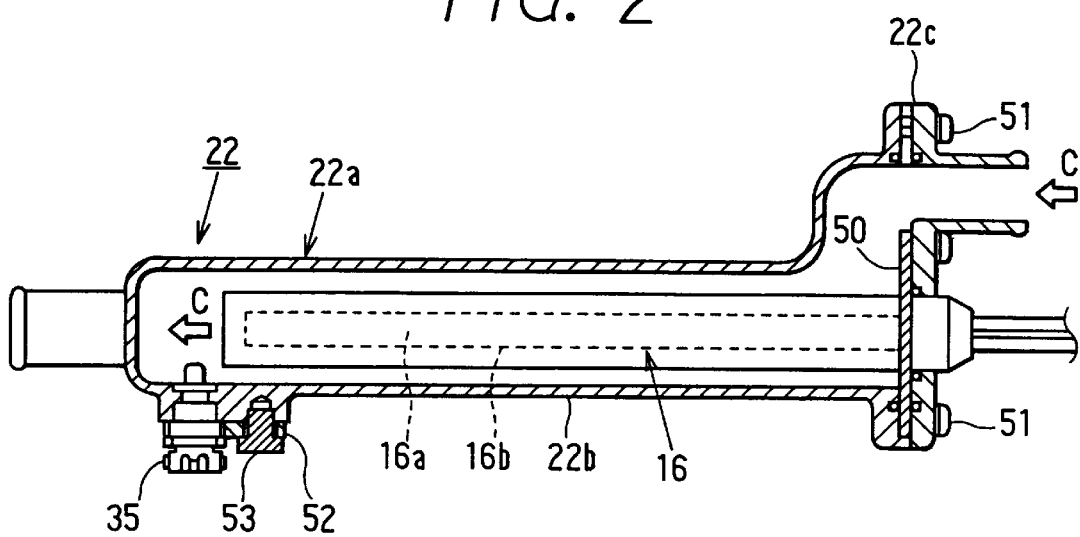
FIG. 2 is a detailed diagram of an electric heater in the embodiment.

The electric heater 16 is connected between the electric water pump 27 and the heater core 25. FIG. 2 is a diagram in which the electric heater 16 is arranged in the cooling water circuit 22.

The electric heater 16 is arranged in a cooling water pipeline 22a of aluminum forming a portion of the cooling water circuit 22, as shown in FIG. 2. This cooling water pipeline 22a can be divided horizontally, as seen in FIG. 2, into two portions: a housing portion 22b for housing the electric heater 16, and a mounting portion 22c for mounting the electric heater 16 fixedly in the housing portion.

On the other hand, the electric heater 16 is constructed so that a heating element 16a (of a nichrome wire in the embodiment) is housed in a cylindrical housing 16b.

In the method of mounting the electric heater 16 and the cooling water pipeline 22a, a stay 50 is attached and fixed at first to the housing 16b. The electric heater 16 is inserted into the housing portion 22b, and the stay 50 is then sandwiched between the housing portion 22b and the mounting portion 22c and is fixed by means of screws 51.

Thus, the cooling water flowing into the cooling water pipeline 22a, as indicated by arrow C, is allowed to flow around the housing 16b. As a result, when the electric heater 16 is active, it heats the cooling water through the housing 16b.

A water temperature sensor 35 acting as means for detecting the temperature of the cooling water flowing around the electric heater 16 is disposed in the housing portion 22b downstream of the electric heater 16. This water temperature sensor 35 is composed of a thermistor or a heat sensitive element in the embodiment. Moreover, the water temperature sensor 35 is fitted through the housing 16b, as shown in FIG. 2, and is fixed in the housing 16b through a mounting stay 52 by means of a screw 53. In FIG. 2, the water temperature sensor 35 and the electric heater 16 are left unhatched.

Figure 3:
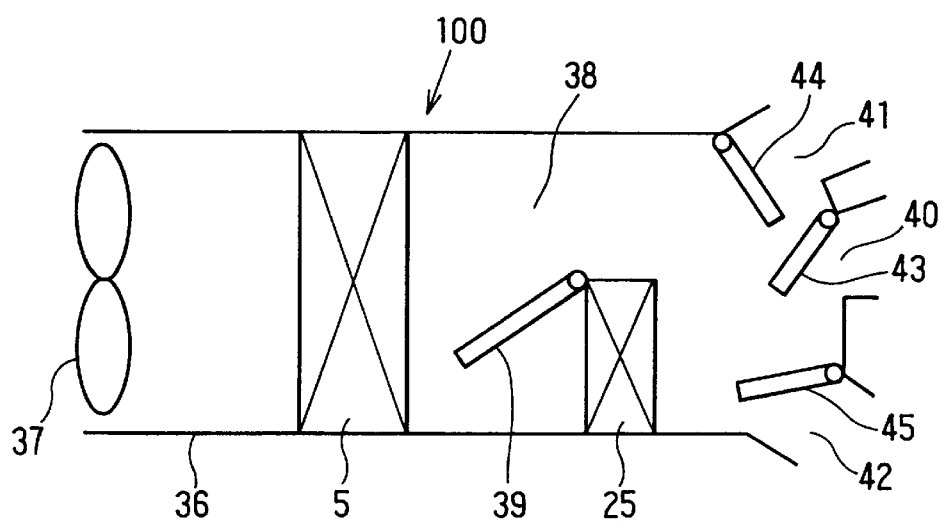
FIG. 3 is a diagram showing the entire construction of a vehicular air conditioning system in the embodiment.

Here will be described the entire construction of the vehicular air conditioning system 100 of the embodiment with reference to FIG. 3.

The vehicular air conditioning system 100 includes an air conditioning case 36 forming an air passage into the vehicular compartment. A blower 37 for establishing an air flow into the vehicular compartment is mounted in an upstream of the air conditioning case 36. Further, the (not-shown) well-known inside/outside air flow switcher is mounted upstream of the blower 37 in the air conditioning case 36. Using this air flow switcher, it is possible to switch between an internal air circulation mode, in which the internal air is introduced into the air conditioning case 36, and an external air introduction mode in which the ambient air is introduced into the air conditioning case 36.

The evaporator 5 of the aforementioned refrigerating cycle unit 1 is disposed downstream of the blower 37 in this air conditioning case 36. As a result, the air in the air conditioning case 36 can be cooled by the evaporator 5.

The aforementioned heater core 25 is disposed in the air conditioning case 36 downstream of the evaporator 5. This heater core 25 is arranged in a portion of the passage of the air conditioning case 36, as shown in FIG. 3. As a result, a bypass passage 38 for the air having passed through the evaporator 5 to bypass the heater core 25 is formed in the air conditioning case 36.

The well-known air mixing door 39 acting as temperature adjusting means is disposed in this air conditioning case 36. Specifically, this air mixing door 39 controls the ratio between the flow rate of air to pass through the bypass passage 38 and the flow rate of air to pass through the heater core 25, thereby adjusting the temperature of the conditioned air. The air mixing door 39 is driven by the not-shown servo motor acting as drive means.

Passages for blowing the air-conditioned wind to different areas in the vehicular compartment, that is, an air passage for the face 40, a defrosting air passage 41 and an air passage for the feet 42, are formed downstream of the heater core 25 with respect to the air flow. The face air passage 40 blows the air-conditioned wind toward the upper half of the driver whereas the defrosting air passage 41 blows the air-conditioned air toward the inner face of the not-shown vehicular front windshield. On the other hand, the foot air passage 42 blows the air-conditioned wind toward the lower half of the driver.

These air passages 40 to 42 are opened/closed by a face door 43, a defrosting door 44 and a foot door 45 all acting as passage switching means. These doors 43 to 45 are driven by the not-shown servo motor acting as drive means. As a result, the vehicular air conditioning system 100 can be switched between the well-known blow modes, i.e., a face mode, a bi-level mode, a foot mode, a foot/defroster mode and a defroster mode.

The construction of the aforementioned control unit 20 will be described with reference to FIG. 1.

This control unit 20 is constructed of a well-known microprocessor which is composed of the not-shown CPU, ROM and RAM. The control unit 20 is equipped with a control circuit for varying the frequency and voltage of the output from the inverter 7 to the three-phase AC motor 6.

The water temperature sensor 35, an internal air temperature sensor 46 acting as means for detecting the temperature of the inside of the vehicular compartment, an ambient air temperature sensor 47 acting as means for detecting the temperature of the outside of the vehicular compartment, a solar radiation sensor 48 acting as means for detecting the solar radiation coming into the vehicular compartment, a voltage detector 50 for detecting the terminal voltage of the vehicular power supply 11, and an air conditioning control panel 49 disposed in the vehicular compartment are connected to the input terminals of the control unit 20. Here, the voltage detector 50 constitutes means for detecting the available battery power of the vehicular power supply 11.

The air conditioning control panel 49 is equipped with a temperature setter 49a for determining a set temperature of the inside of the vehicular compartment and an automatic control (or AUTO) switch 49b for controlling the aforementioned blower 37, air mixing door 39, inverter 7 and electric heater 15 automatically so that the temperature in the vehicular compartment may take the set temperature in accordance with the set temperature set by the temperature setter 49a and the detected values of the aforementioned individual sensors 35, 46, 47 and 48.

On the other hand, a not-shown servo motor or the like for driving the relay 15 and the air mixing doors is connected to the output terminal of the control unit 20.

Moreover, the signals to be inputted to the control unit 20 are subjected to A/D conversion by the not-shown input circuit in the control unit 20 and are then inputted to the aforementioned microprocessor. Here, an ECU 33 is powered by the vehicular power supply 11 when the key switch or the main switch for running the vehicle is turned ON.

The controls of the relay 15, as made by the control unit 20 of the embodiment, will be described with reference to FIG. 4. The following operations are effected with the key switch being ON and the automatic control switch 49b being ON.

Figure 4:
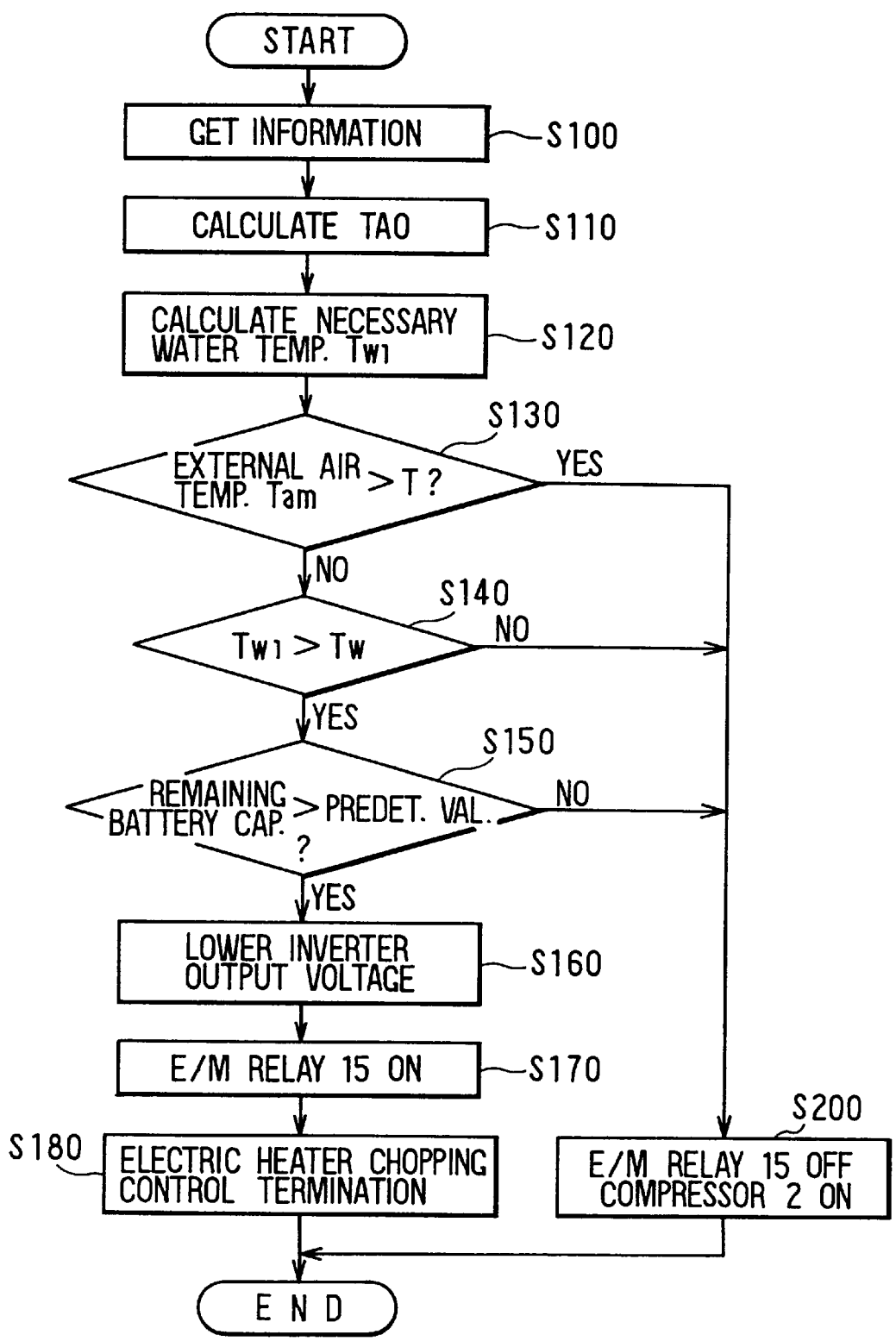
FIG. 4 is a flowchart showing a control process executed by a control unit of the embodiment.

First of all, the routine of FIG. 4 is started. Step S100, reads the set temperatures of the sensors 35 and 46 to 48 and the temperature setter 49a subjected to the A/D conversion.

Step S110 calculates a target blow temperature (i.e., TAO in the following) of the air-conditioned wind to the vehicular compartment on the basis of Equation (1), as stored in advance in the ROM:

$$TAO = Kset \times Tset - Kr \times Tr - Kam \times Tam - Ks \times Ts + C \quad (1)$$

Here, Ts is the set temperature by the temperature setter, Tr is the detected value of the internal air temperature sensor 46, Tam is the detected value of the ambient air temperature sensor, and Ts is the detected value of the solar radiation sensor 48. Moreover, Kset, Kr, Kam and Ks: gains, and C are correcting constants.

Step S120 calculates the necessary water temperature Tw1 of the cooling water to flow into the heater core 25 on the basis of the TAO. Briefly, for a larger TAO, the load for warming the vehicular compartment becomes greater so that a higher necessary water temperature Tw1 is calculated.

Step S130 decides whether or not the detected temperature Tam (or the ambient temperature) of the ambient air temperature sensor 47 is higher than a predetermined value T (e.g., $-1.5°$ C. in the embodiment). When the answer of Step S130 is YES, the routine advances to Step S200, at which point the relay 15 is turned OFF. As a result, the output of the inverter 7 is fed through the output lines 13a to 13c to the three-phase AC motor 6.

When the answer of Step S130 is NO indicating that the detected temperature (the "ambient air temperature"), on the contrary, Tam is lower than the predetermined value T, and the routine advances to Step S140.

Here will be described the reason why it is decided at Step S130 whether or not the ambient air temperature is lower than the predetermined value T, with reference to FIG. 5.

First of all, in the embodiment, the vehicular air conditioning system 100 is mounted on the hybrid vehicle so that the stopping of the engine 23 is frequently repeated depending upon the running conditions. As a result, the cooling water in the cooling water circuit 22 is not always kept at a high level.

As a result, the hybrid vehicle has an insufficient heat source for warming the inside of the vehicular compartment compared to an ordinary vehicle (in which the engine is always active when the ignition switch is turned ON). Moreover, the vehicular compartment is generally warmed when the ambient air temperature is low, that is, when the necessary water temperature Tw1 is high in the embodiment.

Thus, we have examined the necessary water temperature Tw1 necessary for warming the inside of the vehicular compartment sufficiently under individual conditions by employing the ambient air temperature and an actual water temperature Tw, as detected by the water temperature sensor 35, as parameters in the aforementioned vehicle. The experimental data are illustrated in FIG. 5.

Here, the sufficient warming of the inside of the vehicular compartment under the aforementioned individual conditions means the necessary water temperature Tw1, as required for keeping the temperature in the vehicular compartment at 25° C. in the embodiment when the temperature in the vehicular compartment is stable at 25° C., when the solar radiation Ts is 0 and when the set temperature is at 25° C. As seen from FIG. 5, the necessary water temperature Tw1 naturally rises to the higher level for the lower ambient air temperature Tam, at which the inside of the vehicular compartment is more liable to become cold, so that it takes rightwardly lowering characteristics.

Figure 5:
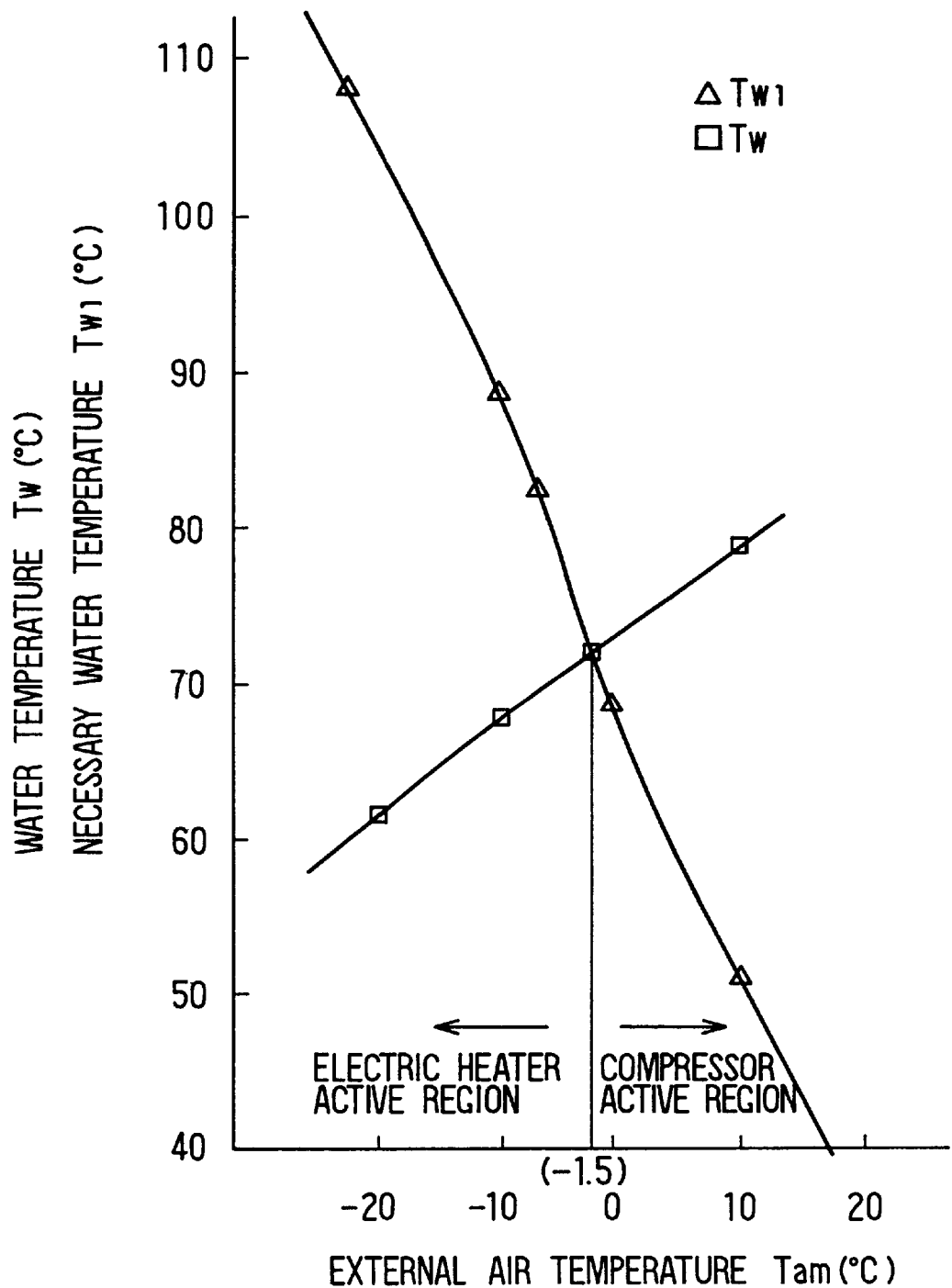
FIG. 5 is a diagram illustrating relations between a necessary water temperature and a practical water temperature in the embodiment.

Therefore, the inventors have added the cooling water temperature of a predetermined time period (e.g., thirty minutes) after the engine 23 was started to the data of the necessary water temperature Tw1 illustrated in FIG. 5. Here, the water temperature Tw at the engine start is set at the same level as the ambient air temperature Tam. For this thirty minutes, moreover, the engine 23 is set to idle (at 1,000 rpm) or in the warm-up operation having the slowest rise in the cooling water temperature.

During warm-up, the warming capacity at the heater core 25 is the lowest of all the running conditions of the vehicle. Moreover, the water temperature Tw after the thirty minutes is the lower for the ambient air temperature Tam, as illustrated in FIG. 5, to have rightwardly rising characteristics.

In short, the following items are understood from FIG. 5.

In FIG. 5, the curve of the necessary water temperature Tw1 and the curve of the actual water temperature Tw intersect each other at an ambient temperature of $-1.5°$ C. (i.e., the aforementioned predetermined level T). As a result, the actual water temperature Tw is higher than the necessary water temperature Tw1, as illustrated in FIG. 5, when the ambient temperature is higher than $-1.5°$ C., and it is understood that the necessary warming capacity at the heater core 25 can be satisfied even if the electric heater 16 is not used.

As illustrated in FIG. 5, on the other hand, at a temperature lower than the ambient air temperature of $-1.5°$ C., the actual water temperature Tw is lower than the necessary water temperature Tw1 so that the warming capacity of the heater core 25 becomes short. In this case, therefore, it is found that the water temperature Tw has to be raised by energizing the electric heater 16.

As a result, when the result of Step S130 is YES indicating that the ambient air temperature Tam is higher than the predetermined level T, it is decided that the warming capacity at the heater core 25 is sufficient, and the relay 15 is turned OFF whereas the compressor 2 is turned (ON). Here, the number of revolutions per unit time of the compressor 2 is controlled by the inverter 7 to the target value which is calculated on the basis of the aforementioned value TAO by the control unit 20.

Subsequently, when the result of Step S130 is NO indicating that the ambient air temperature Tam is lower than the predetermined level T, the routine advances to Step S140, at which the following operations are executed before the electric heater 16 is energized.

Step S140 decides whether or not the necessary water temperature Tw1, as calculated at Step S120, is lower than the actual water temperature Tw. When the necessary water temperature Tw1 is lower than the actual water temperature Tw, the electric heater 16 need not be turned ON. When the result of Step S140 is YES, the routine advances to Step S150. When the answer of Step S140 is NO, the routine advances to Step S200, where the relay 15 is turned OFF.

Step S150 decides whether or not the available battery power of the vehicular power supply 11 exceeds a predetermined value. Here, this available battery power is decided in terms of the terminal voltage of the vehicular power supply, as detected by the voltage detecting means 50. When the result of Step S150 is NO indicating that the available battery power is less than the predetermined value, the vehicle cannot be run by the running electric motor if the power is consumed by the electric heater 16. Therefore, the routine advances to Step S200, where no power is supplied to the electric heater 16.

When the result of Step S150 is YES indicating that the available battery power is more than the predetermined value, the electric heater 16 is energized at Steps S160 to S190 by the relay 15.

At Step S160, when the control unit 20 outputs an instruction signal directing actuation of the relay 15, the output voltage from the three-phase AC motor 6 from the inverter 7 is lowered. In the embodiment, the output voltage is lowered to zero by turning OFF all the transistors 8*a* to 10*a* and 8*b* to 10*b*. After this, the routine advances to Step S170, where the relay 15 is turned ON.

Then, the routine advances to Step S180, where chopping control is performed to control the power supply to the electric heater 16 whereas the three-phase AC motor 6 is stopped as the motor stopping control. Specifically, only the transistor 8*a* is turned ON, and the remaining transistors 8*b*, 9*a*, 9*b*, 10*a* and 10*b* are turned OFF.

As a result, the output from the inverter 7 can be sent only to the output line 13*c* to energize the electric heater 16, and the power supply to the three-phase AC motor 6 is intercepted to stop the motor 6 (i.e., the aforementioned "motor stop control").

As a result, while the electric heater 16 is being energized, the three-phase AC motor 6 can never fail to be stopped. Once the relay 15 is turned ON from OFF, the output voltage of the inverter 7 is lowered to zero at Step S160, and the relay 15 is turned OFF.

Thus in the embodiment, the output voltage of the inverter 7 is lowered to zero, and the relay 15 is turned ON and OFF so that the durability of the relay 15 can be improved. As a result, the existing relay can be used without adding any dedicated relay, so that the cost can be lowered.

In the embodiment, moreover, the electric contacts (i.e., the moving contact 15*b* and the stationary contact 15*c*) of the relay 15 are provided at one of the three output lines 13*a* to 13*c* so that the number of electric contacts can be reduced from that of the prior art thereby lowering the cost. When the relay 15 is thus provided at one of the three output lines 13*a* to 13*c*, trouble may occur when the power is fed from the remaining two output lines 13*a* and 13*b* to the three-phase AC motor 6.

In the embodiment, however, only the transistor 8*a* is turned ON whereas the remaining transistors 8*b*, 9*a*, 9*b*, 10*a* and 10*b* are turned OFF so that the power supply to the three-phase AC motor 6 can be intercepted to avoid the aforementioned trouble in advance.

In the aforementioned chopping control, moreover, the power supply to the electric heater 16 is linearly controlled by switching the transistor 8*a* to change the ON/OFF period of the transistor 8*a* for a constant time period. Moreover, the (not-shown) chopping circuit for the chopping control is disposed in the inverter 7.

Moreover, the chopping control in the embodiment is made to control the actual water temperature Tw to the necessary water temperature Tw1 by increasing the power supply to the electric heater 16 responsive to a larger difference between the necessary water temperature Tw1 and the actual water temperature Tw.

As a result, the water temperature Tw can be linearly controlled to control the actual water temperature Tw to the necessary water temperature Tw1 necessary for the warming capacity so that the power to be consumed in the electric heater 16 can be minimized to control the air conditioning accurately.

Other Embodiments

In the foregoing embodiment, the electric heater 16 employs nichrome wire as its heating element but may be made of any material such as a ceramic heater, if it electrically generates a sufficient amount of heat.

In the embodiment, moreover, the motor for driving the compressor 2 employs the three-phase AC motor but may be either a single-phase AC motor or a three or more phase AC motor.

In the embodiment, moreover, the electric heater 16 heats the cooling water, which may be any heat exchanging fluid. Still further, the electric heater 16 may be disposed directly in the air conditioning unit 36 to heat the air directly.

In the embodiment, moreover, the three-phase AC motor 6 is stopped by turning ON only the transistor 8*a* and turning OFF the remaining transistors (8*b*, 9*a*, 9*b*, 10*a* and 10*b*) when the electric heater 16 is energized. However, the means for stopping the three-phase AC motor 6 may be replaced by a transistor for setting the output lines 13*a* and 13*b* at a common potential to establish no rotating magnetic field.

In the individual embodiments, moreover, when the relay 15 is activated (or turned ON/OFF), the output voltage of the inverter 7 is set to zero but may be lowered to the allowable breakdown voltage of the relay 15.

Here, the AC power, as used in the appended claims, will naturally cover that which is chopped by the inverter 7 from the power coming from the vehicular power supply 11.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A vehicular air conditioning system comprising:

an air conditioning compressor driven by an AC motor of three or more phases;

an inverter for converting an output of a vehicular power supply into AC power to control the AC motor, the inverter having three or more output lines for supplying the AC power to each phase of the AC motor;

an electrical heating unit connected to one of the output lines of the inverter so that vehicular power is supplied to the electrical heating unit through the one of the output lines of the inverter;

a switching unit for switching power from the one of the output lines of the inverter to the electrical heating unit;

signal generating means for generating an instruction signal to turn on the switching unit; and control means for reducing an output voltage of the invertor in response to the instruction signal prior to actuating the switching unit to switch the power to the electrical heating unit.

2. The system of claim 1, wherein the control means is for stopping the AC motor by intercepting power supply to remaining output lines.

3. The system of claim 1, further comprising:

an air conditioning case forming an air passage into an interior of a vehicle compartment;

a heat exchanger for heating air in the air conditioning case with a heat source fluid; and a heat source fluid passage for circulating the heat source fluid to the heat exchanger;

wherein the electrical heating unit is in the heat source fluid passage.

4. The system of claim 3, further comprising:

internal air temperature detecting means for detecting an internal air temperature in the vehicle compartment;

temperature setting means for determining a set temperature in the vehicle compartment;

heat source fluid temperature detecting means for detecting a temperature of the heat source fluid circulating to the heat exchanger; and calculation means for calculating a necessary temperature of the heat source fluid based on at least the internal air temperature detected by the internal air temperature detecting means and the set temperature determined by the temperature setting means;

wherein the control means controls the switching unit to energize the electrical heating unit when the temperature detected by the heat source fluid temperature detecting means is lower than the necessary temperature calculated by the calculation means.

5. The system of claim 3, further comprising:

internal air temperature detecting means for detecting an internal air temperature in the vehicle compartment;

temperature setting means for determining a set temperature in the vehicle compartment;

heat source fluid temperature detecting means for detecting a temperature of the heat source fluid circulating to the heat exchanger; and calculation means for calculating a necessary temperature of the heat source fluid based on at least the internal air temperature detected by the internal air temperature detecting means and the set temperature determined by the temperature setting means;

wherein the control means is for controlling the electrical heating unit so that the temperature detected by the heat source fluid temperature detecting means becomes the necessary temperature calculated by the calculation means.

6. The system of claim 1, further comprising energization control means for linearly controlling power fed to the electrical heating unit by the inverter.

7. The system of claim 6, wherein the energization control means includes chopping control means for controlling chopping of an output of the inverter to the electrical heating unit.

8. A vehicular air conditioning system comprising:

an air conditioning compressor driven by an AC motor of three or more phases;

an inverter for converting an output of a vehicular power supply into AC power to control the AC motor, the inverter having three or more output lines for supplying the AC power to each phase of the AC motor;

an electrical heating unit connected to one of the output lines of the inverter so that vehicular power is supplied to the electrical heating unit through the one of the output lines of the inverter;

a relay for switching power from the inverter to the electrical heating unit, the relay having electrical contacts provided at one of the output lines from the inverter to the AC motor;

a signal generating means for generating an instruction signal for turning on the relay; and control means for stopping the AC motor in response to the instruction signal generated by the signal generating means prior to when the relay is turned on to energize the electrical heating unit.

9. The system of claim 8, wherein the control means is for stopping the AC motor by intercepting power supply to remaining output lines.

10. The system of claim 8, further comprising:

an air conditioning case forming an air passage into an interior of a vehicle compartment;

a heat exchanger for heating air in the air conditioning case with a heat source fluid; and a heat source fluid passage for circulating the heat source fluid to the heat exchanger;

wherein the electrical heating unit is in the heat source fluid passage.

11. The system of claim 10, further comprising:

internal air temperature detecting means for detecting an internal air temperature in the vehicle compartment;

temperature setting means for determining a set temperature in the vehicle compartment;

heat source fluid temperature detecting means for detecting a temperature of the heat source fluid circulating to the heat exchanger; and calculation means for calculating a necessary temperature of the heat source fluid based on at least the internal air temperature detected by the internal air temperature detecting means and the set temperature determined by the temperature setting means;

wherein the control means is for actuating the relay to energize the electrical heating unit when the temperature detected by the heat source fluid temperature detecting means is lower than the necessary temperature calculated by the calculation means.

12. The system of claim 10, further comprising:

internal air temperature detecting means for detecting an internal air temperature in the vehicle compartment;

temperature setting means for determining a set temperature in the vehicle compartment;

heat source fluid temperature detecting means for detecting a temperature of the heat source fluid circulating to the heat exchanger; and calculation means for calculating a necessary temperature of the heat source fluid based on at least the internal air temperature detected by the internal air temperature detecting means and the set temperature determined by the temperature setting means;

wherein the control means is for controlling the electrical heating unit so that the temperature detected by the heat source fluid temperature detecting means becomes the necessary temperature calculated by the calculation means.

13. The system of claim 11, further comprising:

internal air temperature detecting means for detecting an internal air temperature in the vehicle compartment;

temperature setting means for determining a set temperature in the vehicle compartment;

heat source fluid temperature detecting means for detecting a temperature of the heat source fluid circulating to the heat exchanger; and calculation means for calculating a necessary temperature of the heat source fluid based on at least the internal air temperature detected by the internal air temperature detecting means and the set temperature determined by the temperature setting means;

wherein the control means is for controlling the electrical heating unit so that the temperature detected by the heat source fluid temperature detecting means becomes the necessary temperature calculated by the calculation means.

14. The system of claim 8, further comprising energization control means for linearly controlling power fed to the electrical heating unit by the inverter.

15. The system of claim 13, wherein the energization control means includes chopping control means for controlling chopping of an output of the inverter to the electrical heating unit.

16. The system of claim 1, wherein the control means controls the inverter in such a manner that operation of the AC motor is stopped by the inverter when the switching unit is turned on to energize the electrical heating unit.

17. The system of claim 1, wherein the control means controls the switching unit to be turned off after an output voltage of the inverter is reduced, when the electrical heating unit is turned off.

18. A vehicular air conditioning system comprising:

an air conditioning compressor driven by an AC motor having three or more phases;

an inverter for converting an output of a vehicular power supply into AC power to control the AC motor, the inverter having three or more output lines for supplying the AC power to each phase of the AC motor;

an electrical heating unit connected to one of the output lines of the inverter so that the vehicular power is supplied to the electrical heating unit through the one of the output lines of the inverter;

a switching unit for opening and closing an electrical circuit for electrically connecting the one of the output lines of the inverter and the electrical heating unit and for electrically connecting the electrical heating unit and the ground so that one end of the electrical heating unit is coupled to the one end of the output lines of the inverter and the other end of the electrical heating unit is grounded, the switching unit being disposed in the electrical circuit;

signal generating means for generating an instruction signal to close the electrical circuit by the switching unit; and control means for reducing power supplied to the one of the output lines of the inverter prior to the switching unit closing the electrical circuit to energize the electrical heating unit.

19. The system of claim 18, wherein the control means controls the inverter in such a manner that operation of the AC motor is stopped by the inverter, prior to the switching unit closing the electrical circuit to energize the electrical heating unit.

20. The system of claim 18, wherein the control means controls the switching unit to open the electrical circuit after an output voltage of the inverter is reduced, when the electrical heating unit is turned off.

* * * * *